(12) United States Patent
Liu et al.

(10) Patent No.: US 11,620,828 B1
(45) Date of Patent: Apr. 4, 2023

(54) METHODS AND DEVICES FOR EDITING AND GENERATING VIDEOS

(71) Applicant: KWAI INC., Palo Alto, CA (US)

(72) Inventors: Jiayi Liu, Fremont, CA (US); Huayan Wang, Palo Alto, CA (US)

(73) Assignee: KWAI INC., Palo Alto, CA (US)

( * ) Notice: Subject to any disclaimer, the term of this patent is extended or adjusted under 35 U.S.C. 154(b) by 0 days.

(21) Appl. No.: 17/537,463

(22) Filed: Nov. 29, 2021

(51) Int. Cl.
*G06V 20/40* (2022.01)
*G06V 10/82* (2022.01)
*G11B 27/036* (2006.01)

(52) U.S. Cl.
CPC ............. *G06V 20/47* (2022.01); *G06V 10/82* (2022.01); *G06V 20/41* (2022.01); *G06V 20/48* (2022.01); *G06V 20/49* (2022.01); *G11B 27/036* (2013.01)

(58) Field of Classification Search
CPC ........ G06V 20/47; G06V 10/82; G06V 20/41; G06V 20/48; G06V 20/49; G11B 27/036
See application file for complete search history.

(56) References Cited

U.S. PATENT DOCUMENTS

| 7,668,869 | B2* | 2/2010 | Weinberger | G06F 16/78 707/693 |
| 8,842,911 | B2* | 9/2014 | Pettigrew | H04N 1/60 382/167 |
| 9,389,754 | B2* | 7/2016 | Reese | G06F 3/14 |
| 10,708,635 | B2* | 7/2020 | Gonzalez-Banos | H04N 21/2353 |
| 2007/0050467 | A1* | 3/2007 | Borrett | G06F 16/48 709/213 |
| 2017/0161686 | A1* | 6/2017 | Dyrvig | G06Q 10/1053 |
| 2022/0358653 | A1* | 11/2022 | Singh | G06V 20/69 |

* cited by examiner

*Primary Examiner* — Helen Shibru
(74) *Attorney, Agent, or Firm* — Arch & Lake LLP

(57) ABSTRACT

Methods and apparatuses are provided for editing and generating a short video based upon a long video. The method includes: obtaining a plurality of short source video clips as candidate video clips; obtaining attributes of each short source video clip; obtaining a plurality of target base videos according to a target genre, processing the plurality of target base videos by splitting each target base video into a plurality of short target base video clips, and obtaining attributes of each short target base video clip; selecting short target video clips from the plurality of short source video clips, based on distribution of the attributes obtained for the plurality of the short source video clips and the plurality of short target base video clips; and editing and combining the short target video clips selected from the plurality of short source video clips, to obtain a target video.

20 Claims, 4 Drawing Sheets

METHODS AND DEVICES FOR EDITING AND GENERATING VIDEOS

FIELD

The present application generally relates to video editing and generation, and in particular but not limited to, methods and apparatuses for editing and generating short trailer videos for movies and TV dramas.

BACKGROUND

As a new form of communication, short video is becoming one of the important online entertainments for the general public. Converting traditional long videos into attractive short videos has many business values: it can attract potential viewers of long videos to the short video platforms; enhance the diversities of short video works; optimize and refine existing video content, etc. Using artificial intelligence (AI) to automate the production of short videos has become an important way to convert the long videos into short videos.

SUMMARY

In general, this disclosure describes examples of techniques relating to video editing and generation, more specifically, video trailer generation for movies and TV dramas.

According to a first aspect of the present disclosure, a method for video editing and generation is provided. The method includes: obtaining a plurality of short source video clips as candidate video clips; obtaining attributes of each short source video clip; obtaining a plurality of target base videos according to a target genre, processing the plurality of target base videos by splitting each target base video into a plurality of short target base video clips, and obtaining attributes of each short target base video clip; selecting short target video clips from the plurality of short source video clips, based on distribution of the attributes obtained for the plurality of the short source video clips and the plurality of short target base video clips; and editing and combining the short target video clips selected from the plurality of short source video clips, to obtain a target video.

According to a second aspect of the present disclosure, an apparatus is provided for implementing a method for video editing and generation, including: one or more processors; and a memory configured to store instructions executable by the one or more processors; where the one or more processors, upon execution of the instructions, are configured to: obtain a plurality of short source video clips as candidate video clips; obtain attributes of each short source video clip; obtain a plurality of target base videos according to a target genre of a target video, process the plurality of target base videos by splitting each target base video into a plurality of short target base video clips, and obtain attributes of each short target base video clip; select short target video clips from the plurality of short source video clips, based on distribution of the attributes obtained for the plurality of the short source video clips and the plurality of short target base video clips; and edit and combine the short target video clips selected from the plurality of short source video clips, to obtain the target video.

According to a third aspect of the present disclosure, a non-transitory computer readable storage medium is provided, including instructions stored therein, where, upon execution of the instructions by one or more processors, the instructions cause the one or more processors to perform acts including: obtaining attributes of each short source video clip; obtaining a plurality of target base videos according to a target genre, processing the plurality of target base videos by splitting each target base video into a plurality of short target base video clips, and obtaining attributes of each short target base video clip; selecting short target video clips from the plurality of short source video clips, based on distribution of the attributes obtained for the plurality of the short source video clips and the plurality of short target base video clips; and editing and combining the short target video clips selected from the plurality of short source video clips, to obtain a target video.

It is to be understood that both the foregoing general description and the following detailed description are exemplary and explanatory only and are not restrictive of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
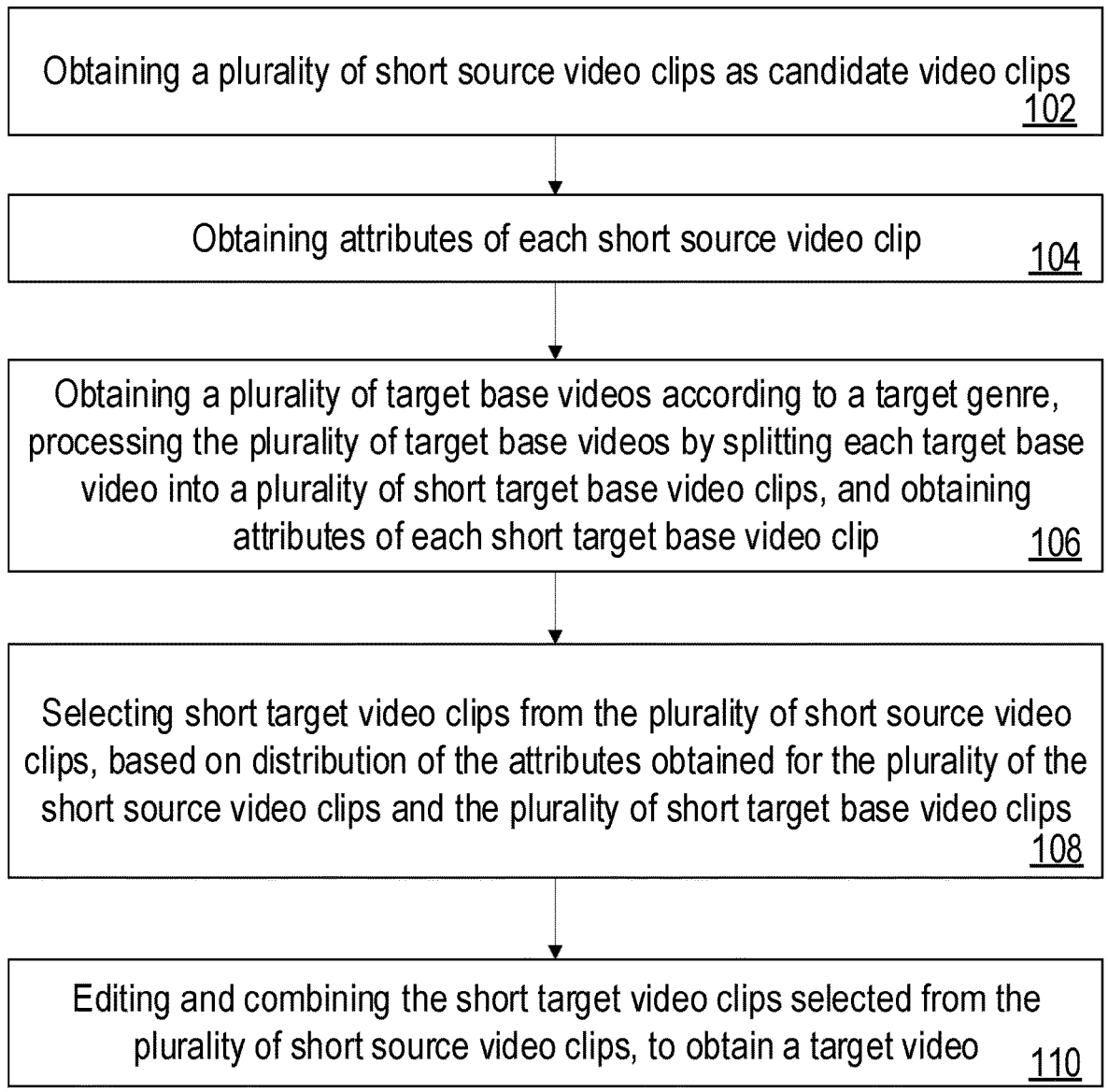
FIG. 1 is a flow diagram illustrating an exemplary video editing and generating process in accordance with one or more examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Some examples of the present disclosure may use AI to understand the creative techniques of excellent videos, and to learn editing algorithms from professional directors. For example, an existing movie trailer may be used as a long video to generate the target data required for a short video, and a model is built to intelligently edit the video.

Video Summarization is a technique that extracts key information from the video to shorten the video duration. Such method commonly uses key frame extraction and video fast forward to complete the summary of the input video. NeuMatch further proposes a video text matching algorithm based on full text information on top of video retrieval. Such method may organize and sort video materials according to movie text abstracts.

In these above methods, videos need to be sorted according to the instructional text summary, and it requires an understanding of the video plot and additional textual guidance information. Besides, the matching accuracy of NeuMatch in the open domain is relatively low, and cannot meet most commercial needs.

In the present disclosure, methods and apparatus for generating short videos from editing long videos are provided. More specifically, it is disclosed that how to split, filter, and integrate content of a long video through an algorithm to generate a high-quality video that meets the requirements of the short video length.

FIG. 1 is a flow diagram illustrating exemplary process of editing and generating short videos in accordance with some examples of the present disclosure. In Step 102, a number of short source video clips are gathered by a processor. These short source video clips are candidate video clips, from which further selections are performed subsequently.

In some examples, these short source video clips are split from a complete long video. The segmentation splits the long video into a number of short source videos with a single shot, based on each independent camera shot. The method of segmentation is generally based on the content change of the video picture, using pixel change statistics, or deep neural network inference to obtain a suitable segmentation point. The segmentation may be performed with some open-source models such as PySceneDetect, TransNetV2, etc.

In Step 104, various attributes of each short source video clip are obtained. The corresponding attributes of each source video clips are analyzed, such as human voice recognition, camera movement category prediction, film genre prediction, character recognition, action recognition, scene recognition, character emotions, etc.

In different examples, different attributes of the short source video clips may be assessed. These attributes may include also short clip length, starting time, camera movement, camera scale, vocal detection, brightness of picture, color temperature of picture, classification of scene location, classification of scene sentiment, optical flow of key character or background, etc.

| A list of the properties and attributes assessed for the video clips |
|---|
| Property List |
| Brightness |
| Color temperature |
| Optical flow of object/background in a video clip |
| Scene sentiment |
| Scene place classification |
| Shot camera scale |
| Shot camera movement |
| Voice detection |
| Background music detection |
| Duration |

Among the above attributes, the brightness and color temperature of the picture may be obtained based on the mathematical statistics of picture pixels. Other attributes may be obtained from the analysis of corresponding deep learning models.

Different attributes may be analyzed with their respective models. Based on the user's needs, an open-source model or a commercial model may be used to analyze these attributes. So far, what have been obtained includes the input movie video data M_input, corresponding to the segmented short source video clips, and the attribute vector $C\_i$ corresponding to each short source video clips, where C represents the vector of all the above attributes, and i represents the i-th short source video clips. Furthermore, attributes C of all the short source video clips cut from one long video correspond to an overall distribution P(C). An attribute itself can be a discrete variable, such as, the number of main characters in the source videos, the mood of each character, etc. The attribute can also be a continuous variable, such as the brightness of the video screen, the size and direction of the overall optical flow of the video, etc. For continuous numerical variables, some analysis methods, such as interval binning, may be applied to increase the reliability of statistics and reduce the impact of noise.

In Step 106, a number of target base videos are obtained according to a target genre, and these target base videos are further processed by splitting them into a number of short target base video clips. The process of splitting the target base videos is similar to how the long source video is segmented.

Figure 2:
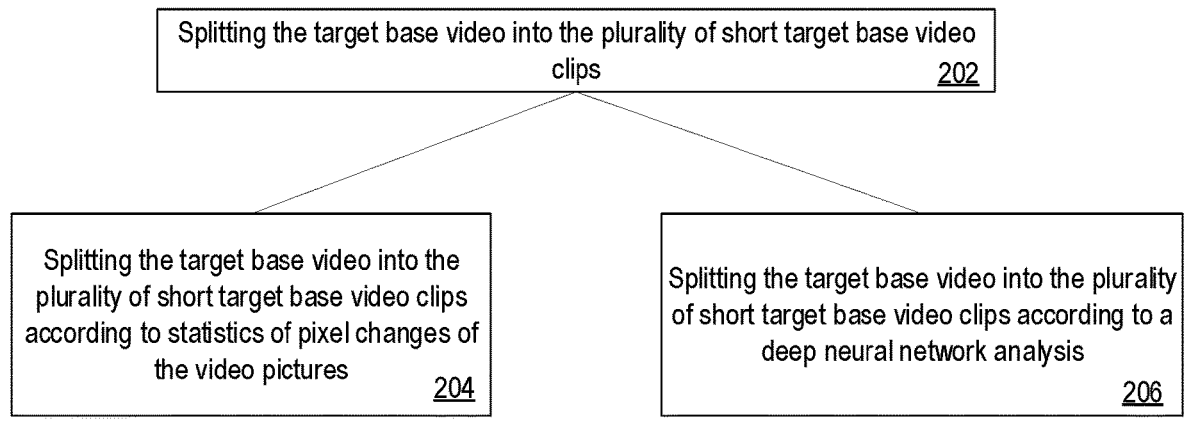
FIG. 2 is a flow diagram illustrating additional steps in the exemplary video editing and generating process in accordance with one or more examples of the present disclosure.

As further illustrated in FIG. 2, one target base video is split into a plurality of short target base video clips. In some examples, the target base video may be split into the short clips according to the statistics of pixel changes of the video pictures as presented in step 204, and such split may be performed by some open-source models, such as PySceneDetect, etc. Alternatively, in some other examples like in step 206, the long target base video may be segmented based on some deep neural network analysis. Such analysis may be done by models like TransNetV2, etc.

Various attributes of each short target base video clip are further obtained and analyzed. Attributes analyzed for the short target base video clips include the same attributes assessed for the short source video clips. In addition, such attributes of short target base video clips may be analyzed in the same way as the short source video clips. As a result, a distribution P'(C) of an attribute $C\_j$ of target base video clips is obtained, where j represents the j-th short target base video clip.

In Step 108, some short target video clips are selected from the plurality of short source video clips. In some examples of the present disclosure, the target video clips are selected with direct sampling methods. Such selection may be performed based on the distributions of the attributes obtained for the short source video clips and short target base video clips. Sampling probabilities of the short target video clips are calculated according to the attribute distributions. There may be two possible ways to control the sampling probability in the attribute distribution to make the attribute distribution of the selected short target video clips close to the attribute distribution of the target video type.

Figure 3:
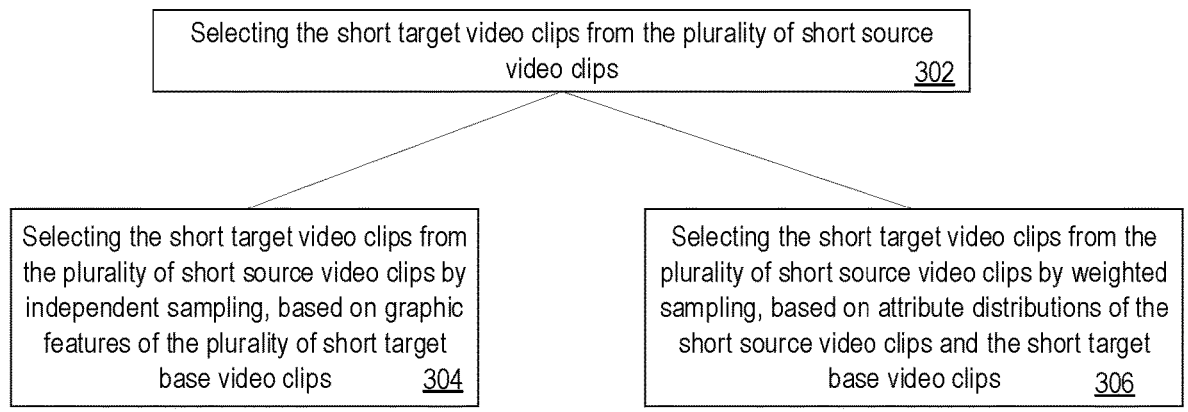
FIG. 3 is a flow diagram illustrating additional steps in the exemplary video editing and generating process in accordance with some examples of the present disclosure.

As further illustrated in FIG. 3, according to the examples of the present disclosure, the target video clips may be selected with two different direct sampling methods First, like in step 304, a method of independent sampling may be adopted. Independent sampling may be performed based on the graphic features of the plurality of short target base video clips. The probability of a short target video clip being selected is $p(C_i) \propto P'(C=C_i)/\Sigma P'(C_j)$. Short target video clips selected in this way may better reflect the attributes and properties of the source video clips.

Second, as in step 306, weighted sampling may also be used to select the short target video clips. The weighted sampling may be performed based on the attribute distributions of the short source video clips and the short target base video clips.

In such examples, the probability of a short target video clip k being selected is $p(C_k) \propto$ $$\frac{P'(C=C_k)}{\sum_j P'(C_j)} \frac{\sum_i P(C_i)}{P(C_k)},$$

where k represents the k-th short target video clip. The weighted sampling methods work better for generating a target video with selected clips, attributes of which are closer to the attributes of the short target base video clips. For example, when the short source video clips are cut from a horror movie, but the target genre is romance, more romantic and warm clips are selected from the horror movie clips.

These two direct sampling methods may select different video clips from the candidate clips, and thus have different effects on the generated target video. The effect of the final generated video may be optimized by balancing between whether it is closer to the attribute distribution of the source video clips or the attribute distribution of the target base video clips.

Figure 4:
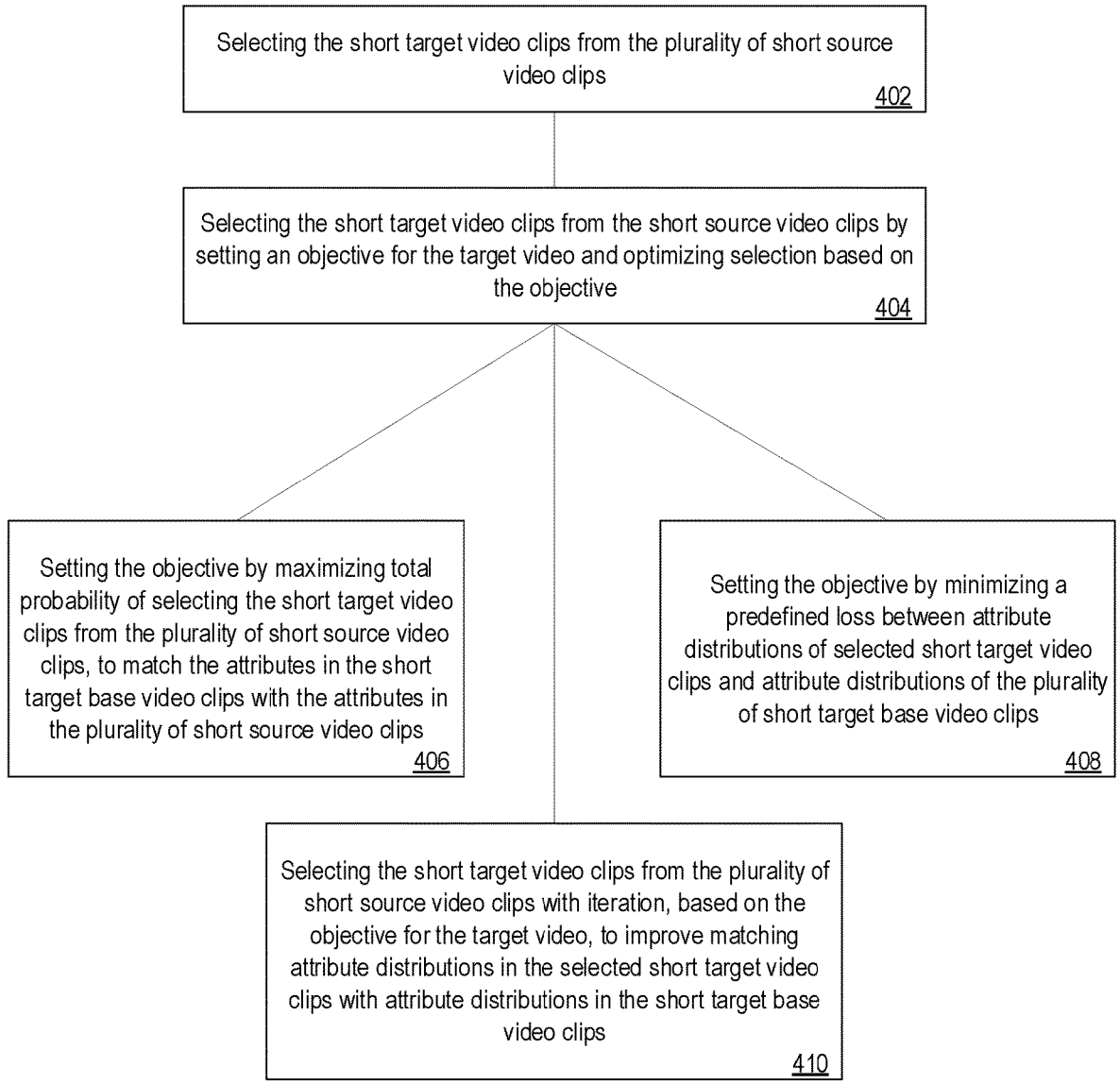
FIG. 4 is a flow diagram illustrating additional steps in the exemplary video editing and generating process in accordance with some examples of the present disclosure.

Alternatively, in some examples, the step 108 may be performed with optimized sampling methods. Such as, an objective of the selected video clips is firstly defined and then optimized for the final generated video. Examples of selection with optimized sampling methods are further presented in FIG. 4.

The short target video clips are selected from the short source video clips by setting an objective for the target video as shown in step 404, and the selection of the video clips are optimized based on the objective. There are multiple ways to set an objective and select the video clips.

In one example as presented in step 406, the objective may be set by maximizing total probability of selecting the short target video clips from the plurality of short source video clips.

The objective function for selecting the video clips is to maximize the total probability of generating a video under the restricted condition $\Pi_s p(C_s)$. In this way, attributes and properties of the selected target video clips are matched closer to the attributes and properties of the short source video clips. For example, fighting scenes appear quite frequently in the source video clips are ensured to be selected in the target video clips.

Alternatively, as shown in step 408, the objective function for selecting the video clips may be to minimize a predefined loss, such as the Kullback-Leibler divergence, between attribute distributions of the selected target video clips and attribute distributions of the short target base video clips. In this way, attributes of the selected video clips and the final video generated are matched closer to the target base video clips. For example, besides the common fighting scenes selected from the source video clips, there are also other scenes selected for setting up the common fighting scenes.

In addition, other restrictions on selecting target video clips may include: the total length of final generated video, the consistency requirements of the connection, the matching of the single-segment video and the rhythm of the background music, etc.

In some other examples, selections and optimization of the short target video clips from the plurality of short source video clips are performed with iteration as in step 410, based on the objective set for the target video. Selection with iteration may help to improve matching attribute distributions in the selected short target video clips with attribute distributions in the short target base video clips. The selection may be optimized with some designated algorithms, such as random sampling or evolutionary algorithm.

Random sampling optimization is a simple and fast optimization method, which aims to gradually approach the optimal solution by randomly sampling and retaining the best results in each iteration. Evolutionary algorithm is a kind of general optimization method, which aims to approximate the optimal solution by iteratively optimizing the objective function by simulating evolutionary mutation.

In step 110, the short target video clips selected from the plurality of short source video clips are further edited and combined to generate a final target video. In some examples, the selected short target video clips may be trimmed into a matching length based on their rhythm of background music. In some examples, transition effects between clips or overall background music may also be added to the selected short video clips.

Examples of the methods in this disclosure do not require understanding of the video content or plot, and can be used as a supplement to the plot-based video generation methods to improve the expressiveness of the generated video.

Examples of the methods in this disclosure may be adapted for different film and TV drama genres. For a given input video, by replacing the target video data of different categories, the video generated by methods in this disclosure can learn and imitate the cinematic style of the corresponding category of film and television videos.

With the exemplary methods, short videos, such as a trailer, may be automatically generated based on a long input video, such as an existing movie. In addition, some expressions and shooting techniques of target videos may be learned, and subsequently applied to the generated short video. These methods may also be combined with some video retrieval methods and other methods that are based upon video understanding to further improve the quality of the automatically generated short video.

Figure 5:
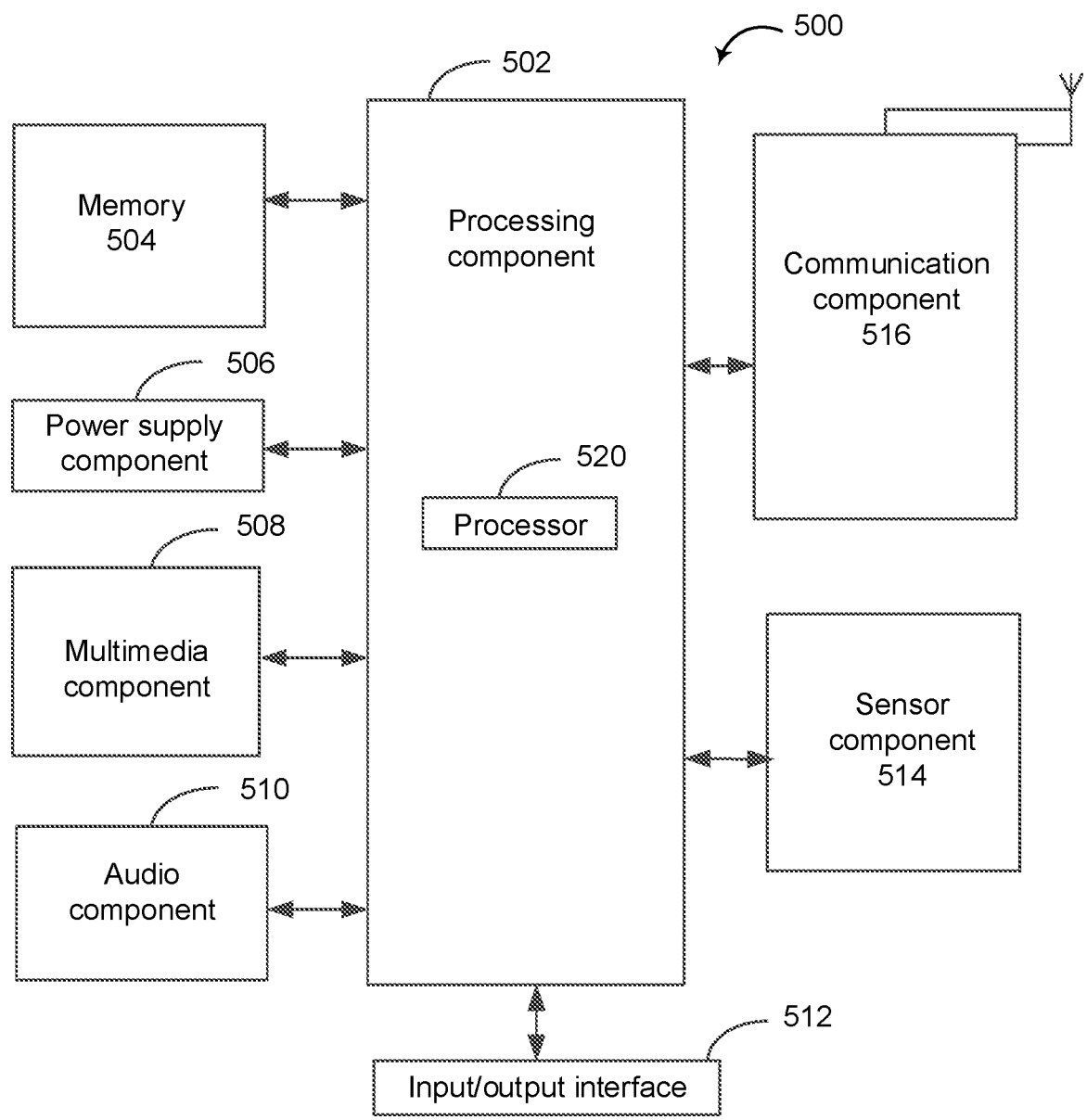
FIG. 5 is a block diagram illustrating an exemplary apparatus for video editing and generation in accordance with some implementations of the present disclosure.

FIG. 5 is a block diagram illustrating an exemplary apparatus for editing and generating videos in accordance with some implementations of the present disclosure. The apparatus 500 may be an edge device, such as a terminal, a mobile phone, a tablet computer, a digital broadcast terminal, a tablet device, a personal digital assistant, or any computing device including one or more processors.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502. The one or more processors 520 may include one or more of following processors: a central processing unit (CPU), a graphic processing unit (GPU), etc.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc. The storage medium may be used to store or buffer data, network, and parameters.

As shown in the flowchart of FIG. 1, the exemplary process for video edit and generation may be implemented in accordance with some examples of the present disclosure.

In step 102, the processor 520 gathers a plurality of short source video clips. A number of short source video clips may be gathered and read by the processor, and these short source video clips are candidate video clips.

In step 104, the processor 520 obtains various attributes of each short source video clip. The processor 520 analyzes various attributes of each source video clips. Such attributes may include human voice recognition, camera movement category prediction, film genre prediction, character recognition, action recognition, scene recognition, character emotions, etc.

In step 106, the processor 520 obtains a number of target base videos. The processor 520 further splits them into a number of short target base video clips. For each short target base video clips, the processor 520 obtains and analyzes various attributes of each short target base video clip, and these attributes may include the same attributes analyzed for the short source video clips.

In step 108, the processor 520 selects some short target video clips from various candidates, the plurality of short source video clips. In some examples, the processor 520 selects some short target video clips based on direct sampling methods, and in some other examples, the processor 520 selects some short target video clips with optimized sampling methods.

With the direct sampling methods, the processor 520 may selecting the short target video clips from the plurality of short source video clips by independent sampling, based on graphic features of the plurality of short target base video clips, or by weighted sampling, based on attribute distributions of the short source video clips and the short target base video clips. For examples performed with optimized sampling methods, the processor 520 sets an objective for the target video first and then optimizes selection based on the objective.

In step 110, the processor 520 edits and combines the short target video clips selected from the plurality of short source video clips, and generates a final target video based on the selected clips.

In some examples, an apparatus for video data analysis is provided. The apparatus includes one or more processors 520; and a memory 504 configured to store instructions executable by the one or more processors; where the one or more processors, upon execution of the instructions, are configured to perform a method as illustrated in FIG. 1.

In some other examples, there is provided a non-transitory computer readable storage medium 504, having instructions stored therein. When the instructions are executed by one or more processors 520, the instructions cause the processors to perform a method as illustrated in FIG. 1.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video editing and generation, comprising:
    obtaining a plurality of short source video clips as candidate video clips;
    obtaining attributes of each short source video clip;
    obtaining a plurality of target base videos according to a target genre, processing the plurality of target base videos by splitting each target base video into a plurality of short target base video clips, and obtaining attributes of each short target base video clip;
    selecting short target video clips from the plurality of short source video clips by balancing between distribution of the attributes obtained for the plurality of the short source video clips and distribution of the attributes obtained for the plurality of short target base video clips; and
    editing and combining the short target video clips selected from the plurality of short source video clips, to obtain a target video.

2. The method of claim 1, wherein splitting the target base video into the plurality of short target base video clips further comprises:
    splitting the target base video into the plurality of short target base video clips according to statistics of pixel changes of the video pictures; or
    splitting the target base video into the plurality of short target base video clips according to a deep neural network analysis.

3. The method of claim 1, wherein obtaining the attributes of each short source video clip or obtaining the attributes of each short target base video clip further comprises:
    obtaining the attributes of the short source video clip or the short target base video clip, wherein the attributes comprise human voice recognition, camera movement prediction, photometry statistics, film genre prediction, character recognition, action recognition, scene recognition, or character emotions.

4. The method of claim 3, wherein each attribute of the short target base video clip is assessed with an independent model to obtain an attribute input for each short target base video clip, and attribute inputs of one attribute for the plurality of short target base video clips correspond to an attribute distribution, wherein the attribute input in the attribute distribution is a discrete variable, or a continuous variable.

5. The method of claim 4, wherein the attribute input being a discrete variable comprises a number of key characters in the short target base video clip, a character ID, a label of the scene place, an action label, sentiment of image, or emotions of characters; and
    wherein the attribute input being a continuous variable comprises brightness of picture, color-temperature of the picture, or optical flow magnitude and direction of the short target base video clip, and the continuous variable is processed by binning to increase liability and reduce noise for the attribute input.

6. The method of claim 1, wherein selecting the short target video clips from the plurality of short source video clips further comprises:
    selecting the short target video clips from the plurality of short source video clips by independent sampling, based on graphic features of the plurality of short target base video clips; or
    selecting the short target video clips from the plurality of short source video clips by weighted sampling, based on attribute distributions of the short source video clips and the short target base video clips.

7. The method of claim 1, wherein selecting the short target video clips from the plurality of short source video clips further comprises:
    selecting the short target video clips from the short source video clips by setting an objective for the target video and optimizing selection based on the objective.

8. The method of claim 7, wherein selecting the short target video clips from the plurality of short source video clips by setting the objective for the target video further comprises:

setting the objective by maximizing total probability of selecting the short target video clips from the plurality of short source video clips, to match the attributes in the short target base video clips with the attributes in the plurality of short source video clips; or setting the objective by minimizing a predefined loss between attribute distributions of selected short target video clips and attribute distributions of the plurality of short target base video clips.

9. The method of claim 7, wherein selecting the short target video clips from the plurality of short source video clips by optimizing the selection based on the objective further comprises:

selecting the short target video clips from the plurality of short source video clips with iteration, based on the objective for the target video, to improve matching attribute distributions in the selected short target video clips with attribute distributions in the short target base video clips, wherein optimizing the selection based on the objective is performed by random sampling or by evolutionary algorithm.

10. The method of claim 1, wherein editing and combining the short target video clips selected from the plurality of short source video clips further comprises:

trimming the selected short target video clips into a matching length based on rhythm of background music; or adding transition effects between the selected short target video clips, or adding overall background music to the target video.

11. An apparatus for implementing a method for video editing and generation, comprising:

one or more processors; and a memory configured to store instructions executable by the one or more processors;

wherein the one or more processors, upon execution of the instructions, are configured to:

obtain a plurality of short source video clips as candidate video clips;

obtain attributes of each short source video clip;

obtain a plurality of target base videos according to a target genre of a target video, process the plurality of target base videos by splitting each target base video into a plurality of short target base video clips, and obtain attributes of each short target base video clip;

select short target video clips from the plurality of short source video clips by balancing between distribution of the attributes obtained for the plurality of the short source video clips and distribution of the attributes obtained for the plurality of short target base video clips; and edit and combine the short target video clips selected from the plurality of short source video clips, to obtain the target video.

12. The apparatus of claim 11, wherein the one or more processors are further configured to:

split the target base video into the plurality of short target base video clips according to statistics of pixel changes of the video pictures; or split the target base video into the plurality of short target base video clips according to a deep neural network analysis.

13. The apparatus of claim 11, wherein the one or more processors are further configured to:

obtain the attributes of the short source video clip or the short target base video clip, wherein the attributes comprise human voice recognition, camera movement prediction, photometry statistics, film genre prediction, character recognition, action recognition, scene recognition, or character emotions.

14. The apparatus of claim 11, wherein the one or more processors are further configured to:

select the short target video clips from the plurality of short source video clips by independent sampling, based on graphic features of the plurality of short target base video clips; or select the short target video clips from the plurality of short source video clips by weighted sampling, based on attribute distributions of the source video clips and the short target base video clips.

15. The apparatus of claim 11, wherein the one or more processors are further configured to:

select the short target video clips from the short source video clips by setting an objective for the target video and optimizing selection based on the objective.

16. A non-transitory computer readable storage medium, comprising instructions stored therein to implement a method for video editing and generation, wherein, upon execution of the instructions by one or more processors, the instructions cause the one or more processors to perform acts comprising:

obtaining a plurality of short source video clips as candidate video clips;

obtaining attributes of each short source video clip;

obtaining a plurality of target base videos according to a target genre, processing the plurality of target base videos by splitting each target base video into a plurality of short target base video clips, and obtaining attributes of each short target base video clip;

selecting short target video clips from the plurality of short source video clips by balancing between distribution of the attributes obtained for the plurality of the short source video clips and distribution of the attributes obtained for the plurality of short target base video clips; and editing and combining the short target video clips selected from the plurality of short source video clips, to obtain a target video.

17. The non-transitory computer readable storage medium of claim 16, wherein splitting the target base video into the plurality of short target base video clips further comprises:

splitting the target base video into the plurality of short target base video clips according to statistics of pixel changes of the video pictures; or splitting the target base video into the plurality of short target base video clips according to a deep neural network analysis.

18. The non-transitory computer readable storage medium of claim 16, wherein obtaining the attributes of each short source video clip or obtaining the attributes of each short target base video clip further comprises:

obtaining the attributes of the short source video clip or the short target base video clip, wherein the attributes comprise human voice recognition, camera movement prediction, photometry statistics, film genre prediction, character recognition, action recognition, scene recognition, or character emotions.

19. The non-transitory computer readable storage medium of claim 16, wherein selecting the short target video clips from the plurality of short source video clips further comprises:

selecting the short target video clips from the plurality of short source video clips by independent sampling, based on graphic features of the plurality of short target base video clips; or selecting the short target video clips from the plurality of short source video clips by weighted sampling, based on attribute distributions of the short source video clips and the short target base video clips.

20. The non-transitory computer readable storage medium of claim 16, wherein selecting the short target video clips from the plurality of short source video clips further comprises:

selecting the short target video clips from the short source video clips by setting an objective for the target video and optimizing selection based on the objective.

* * * * *